(12) United States Patent
Neubauer et al.

(10) Patent No.: US 6,234,125 B1
(45) Date of Patent: May 22, 2001

(54) APPARATUS FOR ANGULAR ADJUSTMENT OF CAMSHAFTS RELATIVE TO CRANKSHAFTS IN COMBUSTION ENGINES

(75) Inventors: Dirk Neubauer, Nachrodt-Wiblingwerde; Dirk Heintzen, Hagen; Klaus-Jörg Breuer, Bochum, all of (DE)

(73) Assignee: AFT Atlas Fahrzeugtechnik GmbH, Werdol (DE)

( * ) Notice: Subject to any disclaimer, the term of this patent is extended or adjusted under 35 U.S.C. 154(b) by 0 days.

(21) Appl. No.: 09/276,768

(22) Filed: Mar. 25, 1999

(30) Foreign Application Priority Data

Mar. 30, 1998 (DE) .............................. 198 14 127

(51) Int. Cl.$^7$ .............................. F01L 13/00; F01M 9/10
(52) U.S. Cl. .............................. 123/90.17; 123/90.15; 123/90.33; 123/196 R; 123/196 M
(58) Field of Search .............................. 123/90.15, 90.16, 123/90.17, 90.31, 90.33, 196 R, 196 M, 198 C

(56) References Cited

U.S. PATENT DOCUMENTS

| | | | |
|---|---|---|---|
| 4,890,695 | * | 1/1990 | Morris et al. .............................. 184/6.3 |
| 4,940,114 | * | 7/1990 | Albrecht .............................. 184/6.3 |
| 5,195,474 | * | 3/1993 | Urata et al. .............................. 123/90.12 |
| 5,247,914 | * | 9/1993 | Imai et al. .............................. 123/90.17 |
| 5,704,317 | * | 1/1998 | Barth .............................. 123/90.17 |
| 5,713,317 | * | 2/1998 | Yoshioka .............................. 123/90.15 |
| 5,765,517 | | 6/1998 | Wiehl .............................. 123/90.17 |
| 5,865,150 | | 2/1999 | Kramer et al. .............................. 123/90.17 |
| 5,915,348 | * | 6/1999 | Scheidt et al. .............................. 123/90.17 |

* cited by examiner

*Primary Examiner*—Weilun Lo
(74) *Attorney, Agent, or Firm*—Darby & Darby

(57) ABSTRACT

An apparatus for varying the phase of the camshaft in the combustion engine of a motor vehicle has an adjuster which is connected to the camshaft and is operable to adjust the phase of the camshaft prior and subsequent to starting of the engine. To this end, the adjuster is connected with a hydraulic drive system which can operate the adjuster while the engine is idle. Once the engine is started, the drive system receives pressurized fluid from the lubricating circuit of the engine. Prior to starting of the engine, the drive system receives pressurized fluid from a source other than the lubricating circuit or from a source which is provided in addition to the lubricating circuit. The other source is preferably the hydraulic circuit of the power steering system (such as a speed-sensitive power steering system) of the motor vehicle.

14 Claims, 2 Drawing Sheets

APPARATUS FOR ANGULAR ADJUSTMENT OF CAMSHAFTS RELATIVE TO CRANKSHAFTS IN COMBUSTION ENGINES

BACKGROUND OF THE INVENTION

The invention relates to improvements in apparatus for adjusting the camshafts of internal combustion engines.

The purpose of a camshaft adjusting apparatus is to ensure an optimal variable valve control. This is accomplished by ensuring that the valve control phase angle can be adjusted continuously and in an accurately controlled manner. As a rule, such apparatus employ adjusters which are force-lockingly connected with and share the angular movements of the camshafts. An electronic control system is provided to transmit signals which initiate rotary movements of the camshaft. The signals which the control system transmits initiate a preliminary adjustment of the camshaft relative to the crankshaft of the combustion engine.

As a rule, a conventional camshaft adjuster receives motion from a hydraulic drive. The fluid is or can be oil, and the requisite oil pressure is generated by the circuit which serves to pressurize the lubricant for the combustion engine. A drawback of such procedure is that, during the engine start-up phase (this phase is critical as far as the generation of exhaust gases is concerned), the angular position of the camshaft relative to the crankshaft still departs from the desired or optimal position. The reason is that, at such time or stage, the lubricating system is yet to build up a fluid pressure which is necessary to ensure a satisfactory phase adjustment of the camshaft relative to the crankshaft. In other words, the hydraulic drive for the camshaft adjuster is yet to build up the necessary fluid pressure, i.e., the first or initial ignition of the engine takes place prior to accurate phase adjustment of the camshaft relative to the crankshaft. An undesirable side effect of such drawbacks of conventional apparatus is that the rotating camshaft at first turns the idling camshaft adjuster which entails the generation of noise that is readily perceivable by the operator and/or other occupant(s) of the motor vehicle.

OBJECTS OF THE INVENTION

An object of the invention is to provide an apparatus which is constructed and assembled and can operate in such a way that it can carry out all necessary phase adjustments of the camshaft not only after but also prior to initial or first ignition of the combustion engine.

Another object of the invention is to provide an apparatus which operates with a pressurized hydraulic fluid and is constructed and designed in such a way that the required fluid pressure is available prior to initial ignition of the combustion engine, i.e., before the engine lubricating system is capable of supplying a hydraulic fluid at the required pressure.

A further object of the invention is to provide an apparatus which can receive hydraulic fluid at a required or desired or necessary pressure before the lubricating system of the combustion engine is capable of furnishing fluid at a required pressure, and which can receive hydraulic fluid at a requisite pressure from an available source of pressurized fluid, i.e., from a source which need not be provided for the sole purpose of ensuring that the apparatus can carry out the required phase adjustments of the camshaft prior to initial ignition of the combustion engine.

An additional object of the invention is to provide a novel and improved pressure converter for use in the above outlined apparatus.

Still another object of the invention is to provide a novel and improved method of adjusting the camshaft relative to the crankshaft in an internal combustion engine.

A further object of the invention is to provide a novel and improved system of valves for use in the above outlined apparatus.

SUMMARY OF THE INVENTION

The invention is embodied in an apparatus for adjusting the phase of a camshaft in a combustion engine which forms part of a power train in a motor vehicle and has idle and operative (i.e., fired and non-ignited) conditions. The apparatus comprises an adjuster which is operatively (e.g., force-lockingly) connected with the camshaft and is operable to adjust the phase of the camshaft, and drive means for the adjuster. The drive means is arranged to operate the adjuster while the engine is in the idle condition (and, of course, also when the engine is in the operative condition).

The apparatus can further comprise signal generating means which is arranged to monitor actual values of a variable parameter (such as the RPM) of the engine and is connected with the drive means, particularly to control the operation of one or more valves in the drive means. This is particularly important when the drive means is a fluid-operated drive means, e.g., a drive means operated by compressed oil. Such drive means comprises a fluid pressurizing (first) circuit which is arranged to build up a fluid pressure that is necessary for camshaft adjustment by the adjuster while the engine assumes its idle condition.

In accordance with an advantageous feature of the invention, the first circuit forms part of the power steering unit of the motor vehicle.

The engine comprises a second fluid pressurizing circuit (this second circuit preferably serves to lubricate the cylinder head, the engine block and/or other parts of the engine) which is connected or connectable to the drive means for the adjuster. The apparatus preferably further comprises means for connecting the first circuit with the adjuster only during predetermined stages of operation of the motor vehicle (particularly when the engine is idle). Such connecting means can comprise a valve (e.g., a four/three-way proportional valve) which is operable to connect the first circuit with the second circuit. This valve is further connected or connectable with the aforementioned engine RPM sensor or monitoring means so that the latter can ensure the establishment of an operative connection between the adjuster and the second and/or first circuit in the idle condition of the engine.

The apparatus preferably further comprises means for establishing a path for the flow of fluid between the first and second circuits, and means (such as a check valve or a membrane) for regulating the flow of fluid along such path, preferably in such a way that the fluid can flow only from the second circuit to the first circuit.

The regulating means can further comprise a pressure converter which is operable to connect the first circuit with the adjuster for the camshaft of the engine. In accordance with an advantageous feature of the invention, the pressure converter can comprise means (such as a prestressed coil spring) for maintaining the pressure of fluid in the first circuit above a predetermined threshold value which is necessary to ensure that the adjuster can change the phase of the camshaft while the engine is idle.

A presently preferred pressure converter can comprise a housing (e.g., in the form of a cylinder) which defines a high-pressure chamber and a low-pressure chamber, and a piston which is reciprocable in the housing between the two chambers. The first circuit is connected or connectable with the high-pressure chamber, and the second circuit is connected or connectable with the low-pressure chamber.

The drive means can further comprise a valve (such as a four/three-way proportional valve) including a valving element which is movable to a predetermined position in which the first circuit can supply pressurized fluid into the high-pressure chamber of the torque converter.

The aforementioned coil spring or other suitable biasing means can be installed in the higher-pressure chamber to bias the piston (the latter than constitute a twin piston) in a direction to expel fluid from one of the chambers, particularly from the lower-pressure chamber.

The pressure converter can further comprise a deformable bladder or another suitable deformable receptacle which can be installed in the high-pressure chamber to receive pressurized fluid from the first circuit and to seal the two circuits (i.e., the two chambers) from each other.

The first circuit can comprise a fluid reservoir (e.g., a sump which supplies fluid to a pump of the first circuit) and a conduit which defines a path for the flow of fluid from the pressure converter to the reservoir. Such conduit can receive suitable valve means (e.g., a four/three-way proportional valve with a built-in check valve) to yieldably oppose the flow of fluid from the pressure converter to the reservoir and to thus maintain the fluid pressure in the first circuit above a predetermined threshold value, e.g., at or above a minimum pressure which is necessary for proper operation of the power steering system if the first circuit forms part of such power steering system.

The novel features which are considered as characteristic of the invention are set forth in particular in the appended claims. The improved camshaft adjusting apparatus itself, however, both as to its construction and its mode of operation, together with numerous additional important features and attributes thereof, will be best understood upon perusal of the following detailed description of certain presently preferred specific embodiments with reference to the accompanying drawings.

DESCRIPTION OF PREFERRED EMBODIMENTS

Figure 1:
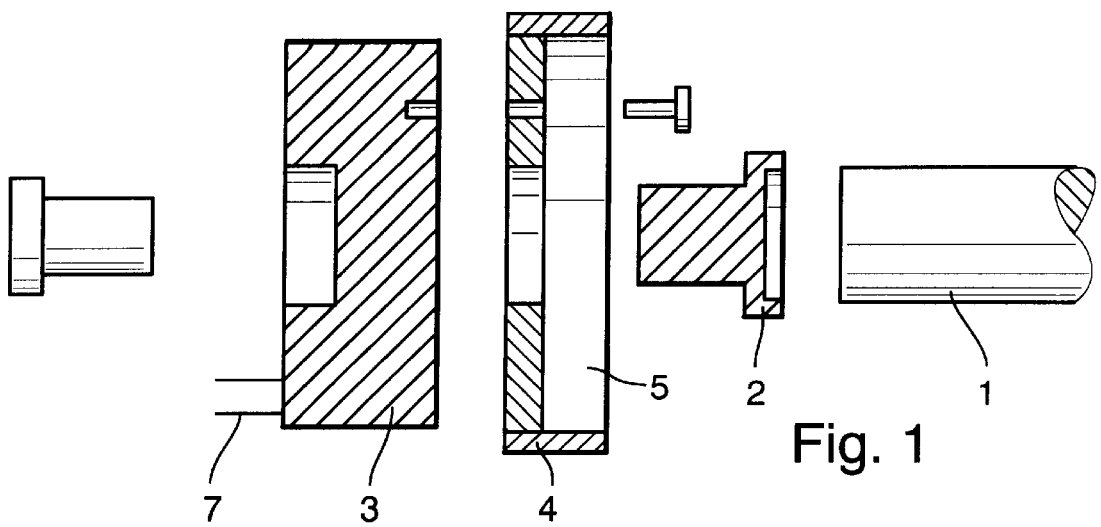
FIG. 1 is an exploded view of a portion of an apparatus which serves to effect phase adjustments of a camshaft and embodies one form of the present invention.

FIG. 1 shows a portion of an apparatus which embodies one form of the present invention. The reference character 1 denotes a portion of a rotary camshaft forming part of an internal combustion engine in the power train of a motor vehicle. The phase of the camshaft 1 can be varied (adjusted) by an adjuster 3 which is connectable to the adjacent end portion of the camshaft by a suitable adapter 2. The latter is force-lockingly connected to the camshaft 1 by a toothed pulley or sleeve 4 which, in turn, is in force-locking engagement with a toothed belt 5 serving to establish a torque transmitting connection between the camshaft 1 and the crankshaft (not shown) of the combustion engine.

The illustrated belt of the drive 4, 5 can be replaced with a chain of a chain and sprocket drive, not shown. An advantage of the illustrated belt 5 and pulley or sleeve 4 is that the camshaft 1 can be adjusted to fit the engine of the power train in a motor vehicle at a reasonable cost. More specifically it is not necessary to modify the design of the cylinder head (14 in FIG. 2) of the engine. All that is necessary is to ensure that the toothed belt 5, the camshaft adapter 2 and the camshaft 1 can match one another. The adjuster 3 can change the phase of the camshaft 1, i.e., it can adjust the camshaft, by way of the form-locking connection including the toothed sleeve 4 and the adapter 2.

The adjuster 3 is a hydraulically driven component of the power train and is connected to or is provided with an inlet 7 for pressurized hydraulic fluid (normally oil). This adjuster receives rotary movement impulses by way of a suitable control and regulating valve system, and each such impulse is converted (by the adapter 2 and toothed sleeve 4) into a rotary movement of the camshaft 1. The control, by way of the valve system, is carried out as a function of monitored actual crankshaft and camshaft positions by sensor means (not shown in FIG. 1). Additional sensors can be resorted to in order to transmit signals denoting changes of one or more additional variable parameters.

Figure 2:
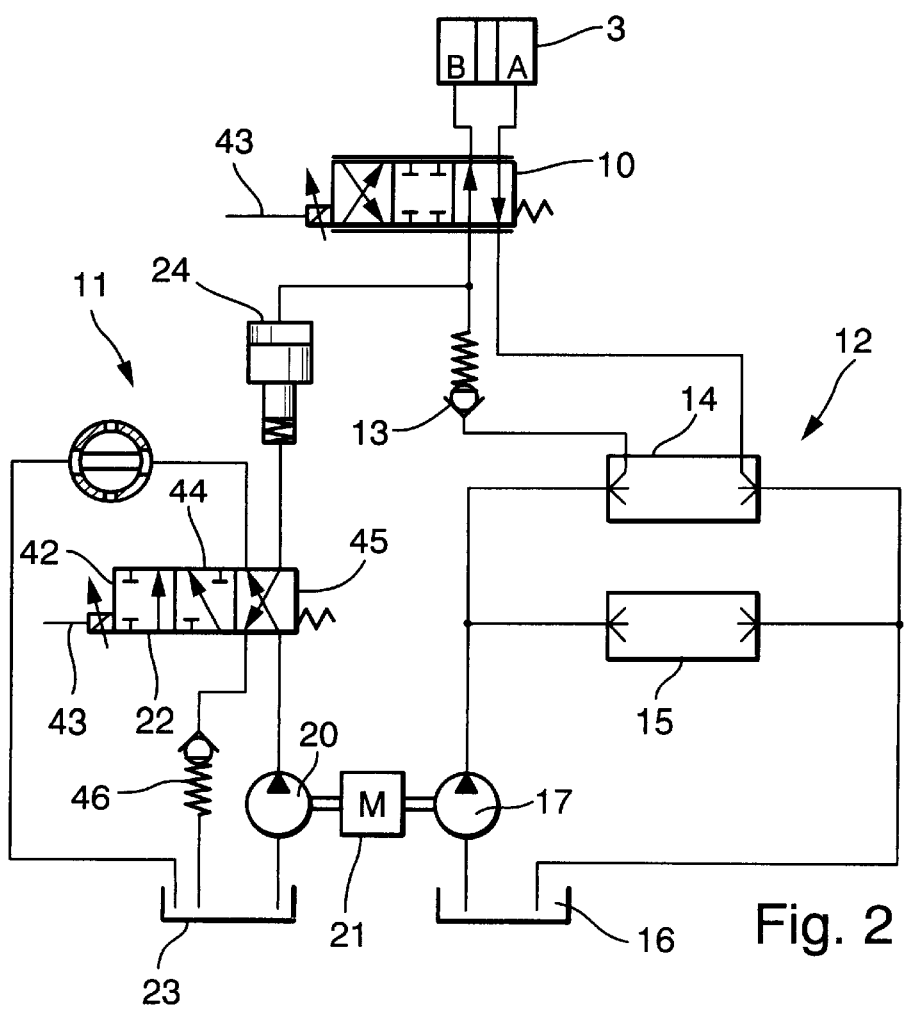
FIG. 2 is a diagrammatic view of that portion of the apparatus which can transmit motion to an adjuster for the camshaft of FIG. 1.

FIG. 2 shows a system of valves which serve to supply (at 7) pressurized fluid to the camshaft adjuster 3. The latter is connected to two pressurized fluid circuits by way of a four/three-way valve 10. The circuits in question are a sensor circuit 11 which is required for the power steering unit or system 111 of the motor vehicle, and a pressurized hydraulic fluid lubricating circuit 12 which is associated with the combustion engine. The two circuits are connected to each other by a conduit 13a which establishes a path for the flow of hydraulic fluid from the circuit 12 to the circuit 11 by way of a check valve 13. The latter can be replaced with a suitable membrane.

The circuit 12 for lubricating fluid serves to supply pressurizd fluid to the cylinder head 14 and the engine block 15 of the combustion engine, and is connected to a sump 16 which supplies fluid to a pump 17 serving to deliver pressurized fluid to the cylinder head 14 and engine block 15.

The servo circuit 11 for the power steering unit or system 111 of the motor vehicle comprises a discrete second pump 20. The latter is driven by an electric motor 21 which further serves to drive the pump 17 of the engine lubricating circuit 12. The pump 20 can receive hydraulic fluid from a reservoir 23 which can receive fluid from a valve 22 (such as a four/three-way proportional valve) along a path defined by a conduit 46a containing a check valve 46. The reservoir 23 can further receive fluid from the power steering system 111. The connection between the outlet of the valve 22 and the conduit 13a leading to the check valve 13 and the valve 10 and camshaft adjuster 3 comprises a novel and improved reservoir pressure converter 24.

Figure 3:
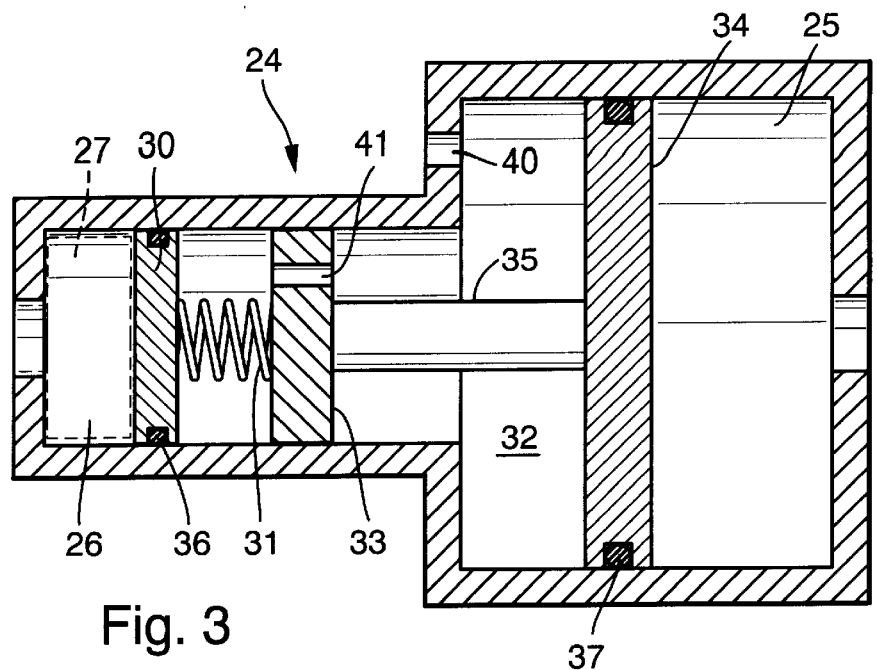
FIG. 3 is an enlarged axial sectional view of a reservoir pressure converter which is utilized in the apparatus of FIG. 2.

The details of the pressure converter 24 are shown in FIG. 3. This pressure converter comprises a cylinder or housing 24a defining a low-pressure chamber 25 on the lubricating fluid side and a high-pressure (plenum) chamber 26 on the servo fluid side. The high-pressure chamber 26 contains a flexible receptacle here shown as a bladder 27 which confines pressurized fluid supplied by the circuit 11 via valve 22. The pressurization of hydraulic fluid supplied by the circuit 11 can be effected by a reservoir piston 30 and an energy storing resilient element 31 here shown as a coil spring. The thus pressurized fluid acts upon a double piston 32 having two crowns or heads 33, 34 connected to each other by a piston rod 35. The piston 30 on the servo fluid side and the piston crown 34 on the lubricating fluid side are respectively provided with annular seals (such as O-rings) 36 and 37. That part of the space in the cylinder 24a which is located between the piston crowns 33, 34 and contains the piston rod 35 is ventilated by way of ports 40 and 41.

The manner of effecting a camshaft adjustment by resorting to the apparatus shown in FIGS. 1 to 3 will be described in detail with reference to FIG. 2 which shows the drive means for the adjuster 3. In its starting position (42), the mobile valving element of the valve 22 establishes a direct communication between the pressure outlet of the pump 20 and the pressure converter 24, and the power steering system 111 is then sealed from the pump 20. When the combustion engine (including the parts 14 and 15) is rendered operative (ignited), the entire body of pressurized fluid in the circuit 11 is available for an adjustment of the camshaft 1 by way of the valve 10 and adjuster 3. This novel feature is highly desirable and advantageous because, as a rule, the power steering system 111 is not put to use before the engine is started. Thus, the adjuster 3 can change the phase of the camshaft 1 (if necessary) to a desired extent before the engine is on.

The characters 43 and 143 denote conductor means serving to transmit to the valves 22 and 10 signals from a standard engine RPM sensor 43a. When the RPM of the engine rises to a predetermined value, the valving element of the valve 22 assumes an intermediate position 44 in which it connects the outlet of the pump 20 directly with the circuit 11, i.e., with the power steering system 111. In other words, the full fluid pressure furnished by the pump 20 is then available for operation of the power steering system 111. However, the pressurized servo fluid which is simultaneously pumped into the flexible receptacle 27 in the high-pressure chamber 26 of the pressure converter 24 applies pressure to the double piston 32 (by way of the piston 30 and the energy storing element 31). Thus, any leakage can be compensated for and/or corrections of phase of the camshaft 1 can be carried out while the double piston 32 is being acted upon by pressurized fluid in the circuit 11 (via valve 22, fluid in the receptacle 27, piston 30 and energy storing resilient element 31).

When the fluid pressure in the lubricating circuit 12 rises to a predetermined value (this takes place in response to ignition of the engine), the valving element of the valve 22 assumes the position 45 (shown in FIG. 2). At such time, the engine operates normally, the pressure in the low-pressure chamber 25 of the pressure converter 24 rises in response to admission of pressurized fluid from the pump 17 via conduit 13a and valve 10, and a certain amount of fluid is expelled from the receptacle 27 via conduit 45a, valve 22, conduit 46a and check valve 46, and back into the reservoir 23.

The check valve 46 serves to prevent sudden drops of fluid pressure in the circuit 11 for the power steering system 111 as well as a drop of fluid pressure in the chamber 26 of the pressure converter 24 below atmospheric pressure. Such undesirable drop of fluid pressure in the circuit 11 could result in undesirable flow of fluid from this circuit. This additional safety feature (check valve 46 or an equivalent thereof) ensures that the auxiliary circuit 11 and the power steering system 111 operate properly during normal operation of the motor vehicle (i.e., when the ignition system of the engine is on and the circuit 12 lubricates the parts (such as 14, 15) of the engine.

Figure 4:
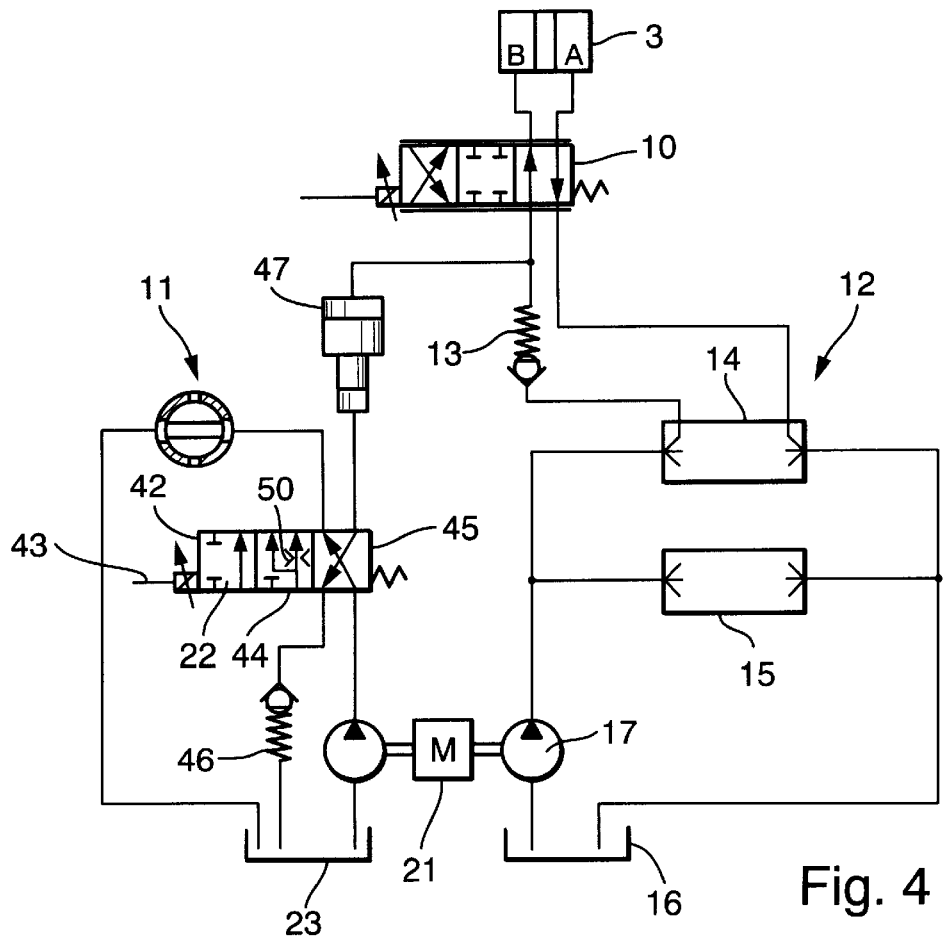
FIG. 4 is a diagrammatic view of an apparatus which constitutes a modification of the apparatus shown in FIGS. 1 to 3 in that it employs a modified pressure converter.

FIG. 4 shows all necessary details of a second apparatus wherein the reservoir pressure converter 24 of FIGS. 2 and 3 is replaced with a standard pressure converter 47. The latter differs from the pressure converter of FIG. 3 in that the energy storing resilient element 31 is omitted. More specifically, the resilient element 31 is replaced with a throttle valve 50 which is installed in or otherwise associated with the valving element of the four/three-way proportional valve 22' for the auxiliary circuit 11' of FIG. 4. The valve 50 ensures that, when the valving element of the valve 22' assumes its intermediate position 44, a preselected percentage of pressurized fluid in the circuit 11' is available for adjustment of the camshaft (not shown in FIG. 4) by way of the adjuster 3. As in the apparatus of FIGS. 1 to 3, such preselected percentage of pressurized fluid furnished by the circuit 11' can compensate for any leakage of fluid in the conduit 12. The valving element of the valve 22' moves to the position 45 as soon as the lubricating circuit 12 has built up sufficient fluid pressure to ensure satisfactory operation of the adjuster 3 for the camshaft after the engine has been turned on and the vehicle is in actual use.

The apparatus of FIGS. 1–3 and 4 share the feature that, in the exhaust-gas critical engine startup phase, at least a high percentage of (but preferably the full) fluid pressure generated by the circuit 11 or 11' can be utilized for adjustment of the camshaft. When the valving element of the valve 22 or 22' assumes the intermediate position 44 (in which the pump 20 delivers pressurized fluid to the power steering system 111), the spring 31 or the valve 50 ensures that the circuit 11 or 11' can compensate for any leakage in the lubricating circuit 12. At such time, pressurized fluid which is being utilized for an adjustment of the camshaft 1 is furnished by the circuit 12. Thus, adjustments of the camshaft 1 during normal operation of the motor vehicle (when the combustion engine is on and the lubricating circuit 12 is in a condition to furnish to the chamber 25 in the cylinder 24a of FIG. 3, or to the corresponding chamber of the cylinder in the standard pressure converter 47 of FIG. 4, a suitable fluid at a pressure which suffices to effect a satisfactory adjustment of the camshaft) is the same as in heretofore known motor vehicles. The important difference between the improved camshaft adjusting apparatus and conventional camshaft adjusting apparatus is that all of the pressurized fluid furnished by the circuit 11 or 11' is available for adequate adjustments of the camshaft while the combustion engine is idle, i.e., prior to first ignition or firing of the engine. Once the engine is on, the circuit 11 or 11' can compensate for fluid leakage (if any) in the lubricating circuit 12, and this is ensured by causing the valving element of the valve 22 or 22' to assume the intermediate position 44. Such valving element assumes the position 45 when the engine is on and the adjustment of the camshaft 1 is taken over exclusively by the lubricating circuit 12.

Since the adjustment of the camshaft 1 can begin prior to first ignition of the engine, the camshaft invariably assumes an optimum position relative to the crankshaft before the engine is on, i.e., the position of the camshaft can be selected to be in an optimum relationship with the starting phase of the engine. For example, it is often desirable to furnish to the engine cylinders a richer mixture during starting, i.e., a mixture which is richer than the mixture supplied during normal operation of the engine. The improved apparatus can be readily set up to regulate the phase adjustment of the valves in the engine, and hence the phase of the camshaft, to satisfy such requirements.

It is within the purview of the invention to replace the circuit 11 or 11' with another hydraulic fluid pressurizing circuit which can furnish to the pressure converter 24 or 47 a fluid at a pressure which suffices to ensure adequate adjustments of the camshaft 1 prior to first ignition of the engine. Resort to the circuit 11 or 11' is preferred at this time because, as a rule, pressurized fluid in the circuit of the power steering system 111 is not needed before the engine is on.

Even if the delivery of pressurized fluid to the flexible receptacle 27 in the high-pressure chamber 26 of the pressure converter 24 or 47 entails a drop of pressure of that fluid which remains available for the power steering system 111, this is not noticed during starting of the engine. Furthermore, and since it is presently preferred to disconnect the circuit 11 or 11' from the adjuster 3 as soon as the engine is on and the circuit 12 is in a condition to supply hydraulic fluid at requisite pressure to the adjuster 3, the full pressure of fluid supplied by the circuit 11 or 11' is then available for proper operation of the steering system 111.

The sensor 43a is connected to the valves 10, 22 or 10, 22' because the RPM of the engine is a highly accurate indicator of the condition of the engine, i.e., of the difference between the starting and normal operation of the engine. This ensures that the signals via conductor means 43, 143 can be utilized to guarantee proper timing of changes of the position of the mobile valving element of the valve 22 or 22' in order to control the flow of fluid from the pump 20 to the chamber 26 and from the chamber 26 to the sump 23 in an optimum manner.

Reliable separation of the circuit 12 from the circuit 11 or 11' is desirable for reasons of safety, namely to prevent an excessive drop of fluid pressure in either of the two circuits as a result of uncontrolled communication between such circuits. Adequate sealing of the two circuits from each other is advisable or necessary on the additional ground that the fluid in the circuit 11 or 11' is not, or need not always be, the same as the fluid in the lubricating circuit 12. The separating function is performed, in a very simple but highly reliable manner, by the check valve 13 (or by the aforementioned membrane which can be utilized in lieu of, or in addition to, the check valve).

The purpose of the pressure converter 24 or 47 is to account for the fact that the pressure of hydraulic fluid in the circuit 11 or 11' often departs from the fluid pressure in the circuit 12 when the motor vehicle is in use. The pressure converter 24 exhibits the additional advantage that the provision of the energy storing resilient element 31 renders it possible to dispense with the need for additional (outside) energy source in order to ensure that the pressure of hydraulic fluid in the chambers 25 and 26 suffices to satisfy the requirements for timely adjustments of the camshaft 1 regardless of whether or not the engine is running.

The deformable receptacle 27 (or an analogous container for pressurized fluid which is supplied by the pump 20 via valve 22 or 22' of the drive means for the adjuster 3) exhibits the advantage that it constitutes an additional barrier against the flow or any uncontrolled flow of pressurized hydraulic fluid from the circuit 11 or 11' to the circuit 12 or vice versa.

U.S. Pat. No. 5,765,517 (granted Jun. 16, 1998 to Hermann Wiehl for "DEVICE FOR CONTINUOUS ANGULAR ADJUSTMENT BETWEEN A CAMSHAFT AND A CRANKSHAFT") discloses an apparatus wherein an adjusting piston for the camshaft is held against movement during an engine starting phase until a sufficient fluid pressure is built up in a chamber of the cylinder for the adjusting piston. This publication does not disclose or sugest the utilization of two hydraulic circuits for alternative or simultaneous delivery of a pressurized hydraulic fluid to an adjuster for the camshaft, and this publication also fails to suggest the utilization of an auxiliary or secondary hydraulic circuit for adjustment (if necessary) of the camshaft prior to ignition of the internal combustion engine in the power train of a motor vehicle.

U.S. Pat. No. 5,865,150 (granted Feb. 2, 1999 to Ulrich Kramer et al. for "DEVICE FOR VARYING THE VALVE TIMING OF GAS EXCHANGE VALVES OF AN INTERNAL COMBUSTION ENGINE") discloses a system which prevents leakage of hydraulic fluid between certain component parts of an apparatus which serves to vary the valve timing of gas exchange valves in an internal combustion engine.

The disclosures of the aforementioned patents, as well as those of all commonly owned U.S. patents and pending United States patent applications are incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of adjusting camshafts in the combustion engines of motor vehicles and, therefore, such adaptations should and are intended to be comprehended within the meaning and range of equivalence of the appended claims.

What is claimed is:

1. Apparatus for adjusting the phase of a camshaft in a combustion engine which forms part of a power train in a motor vehicle and has idle and operative conditions, comprising:

an adjuster operatively connected with the camshaft and being operable to adjust the phase of the camshaft;

a fluid-operated drive means including a fluid pressurizing circuit, said circuit being arranged to build up a fluid pressure which is necessary for camshaft adjustment by said adjuster while the engine is in said idle condition;

a second fluid pressurizing circuit which is connected to the drive means;

means for establishing a path for the flow of fluid between said circuits; and a pressure converter which is operable to connect the circuit of the drive means to the adjuster for regulating the flow of fluid along said path; said converter comprising:

a housing which defines a high-pressure chamber and a low-pressure chamber and a piston which is reciprocable in said housing between said chambers;

wherein the circuit of the drive means is connectable to the high-pressure chamber, and the second circuit is connectable to the low-pressure chamber.

2. The apparatus of claim 1, further comprising signal generating sensor means arranged to monitor actual values of a variable parameter of the engine and being connected with said drive means.

3. The apparatus of claim 1, wherein said drive means further comprises a valve including a valving element movable to a predetermined position in which the circuit of said drive means can supply pressurized fluid to said pressure converter.

4. The apparatus of claim 1, wherein the motor vehicle further comprises a power steering unit including said first fluid pressurizing circuit.

5. The apparatus of claim 1, wherein said regulating means comprises a membrane.

6. The apparatus of claim 1, further comprising means for connecting said circuit of said drive means with said adjuster only during predetermined stages of operation of the motor vehicle.

7. The apparatus of claim 1, wherein said drive means further comprises a valve operable to connect the circuit of said drive means with said second circuit.

8. The apparatus of claim 7, wherein said valve comprises a four/three-way proportional valve.

9. The apparatus of claim 7, further comprising a signal-transmitting engine RPM sensor connected with said valve.

10. The apparatus of claim 1, wherein said, pressure converter comprises means for maintaining the pressure of fluid in the circuit of said drive means above a predetermined threshold value.

11. The apparatus of claim 1, wherein said regulating means comprises a check valve arranged to permit the flow of fluid from said second circuit to the circuit of said drive means.

12. Apparatus for adjusting the phase of a camshaft in a combustion engine which forms part of a power train in a motor vehicle and has idle and operative conditions, comprising:
- an adjuster operatively connected with the camshaft and being operable to adjust the phase of the camshaft;
- a fluid-operated drive means including a fluid pressurizing circuit, said circuit being arranged to build up a fluid pressure which is necessary for camshaft adjustment by said adjuster while the engine is in said idle condition;
- a second fluid pressurizing circuit which is connected to the drive means;
- means for establishing a path for the flow of fluid between said circuits; and
- a pressure converter which is operable to connect the circuit of the drive means to the adjuster for regulating the flow of fluid along said path; said converter comprising:
  - a cylinder which defines a high-pressure chamber and a low-pressure chamber and a piston which is reciprocable in said cylinder between said chambers; and means for yieldably biasing the piston in a direction to expel fluid from one of the chambers;
- wherein the circuit of the drive means is connectable to one of the chambers and the second circuit is connectable with the other of the chambers.

13. Apparatus for adjusting the phase of a camshaft in a combustion engine which forms part of a power train in a motor vehicle and has idle and operative conditions, comprising:
- an adjuster operatively connected with the camshaft and being operable to adjust the phase of the camshaft;
- a fluid-operated drive means including a fluid pressurizing circuit, said circuit being arranged to build up a fluid pressure which is necessary for camshaft adjustment by said adjuster while the engine is in said idle condition;
- a second fluid pressurizing circuit which is connected to the drive means;
- means for establishing a path for the flow of fluid between said circuits; and
- a pressure converter which is operable to connect the circuit of the drive means to the adjuster for regulating the flow of fluid along said path; said converter comprising:
  - a housing which defines a high-pressure chamber and a low-pressure chamber;
  - a piston which is reciprocable in the housing between said chambers, and
  - a deformable receptacle which is received in said high-pressure chamber;
- wherein the circuit of the drive means is connectable to the receptacle, and the second circuit is connectable to the low-pressure chamber.

14. Apparatus for adjusting the phase of a camshaft in a combustion engine which forms part of a power train in a motor vehicle and has idle and operative conditions, comprising:
- an adjuster operatively connected with the camshaft and being operable to adjust the phase of the camshaft;
- a fluid-operated drive means including a fluid pressurizing circuit, said circuit being arranged to build up a fluid pressure which is necessary for camshaft adjustment by said adjuster while the engine is in said idle condition, said circuit comprising:
  - a fluid reservoir and conduit means which defines a first path for the flow of fluid from the pressure converter to the reservoir;
- a second fluid pressurizing circuit connected to the drive means;
- means for establishing a second path for the flow of fluid between said circuits;
- a pressure converter which is operable to connect the circuit of the drive means to the adjuster for regulating the flow of fluid along said second path; and
- valve means provided in said conduit means for yieldably opposing the flow of fluid from said pressure converter to said reservoir to maintain the fluid pressure in said circuit of said drive means above a predetermined threshold value.

* * * * *